Figure 7:
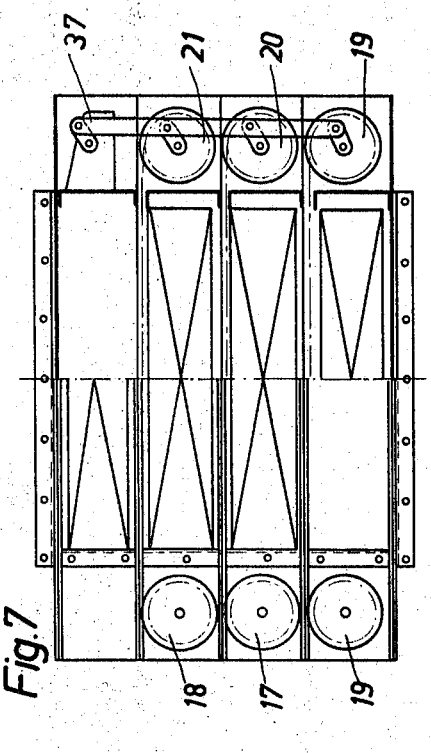

United States Patent

[11] 3,572,016

| [72] | Inventor | Gerhard Max Neumann |
| | | Berlin-Dahlem, Germany |
| [21] | Appl. No. | 715,233 |
| [22] | Filed | Mar. 22, 1968 |
| [45] | Patented | Mar. 23, 1971 |
| [73] | Assignee | Delbag Luftfilter G.m.b.H. |
| | | Berlin, Germany |
| [32] | Priority | Apr. 14, 1967 |
| [33] | | Germany |
| [31] | | D52813 |

[54] ROLL-TYPE BAND FILTER SUITABLE FOR VENTILATING DUCTS
7 Claims, 11 Drawing Figs.

[52] U.S. Cl. .................................................. 55/353,
 55/354, 55/418, 55/484, 55/494
[51] Int. Cl. ........................................... B01d 46/18
[50] Field of Search.......................................... 55/290,
 351—354, 484, 509, 418, 494; 210/387

[56] References Cited
UNITED STATES PATENTS

| 1,456,360 | 5/1923 | Budil ........................ | 55/484X |
| 2,230,765 | 2/1941 | Shimer ..................... | 55/509X |
| 2,522,568 | 9/1950 | Dahlman .................. | 55/354 |
| 2,579,440 | 12/1951 | Palmer ..................... | 55/354 |
| 3,047,994 | 8/1962 | Le Brun.................... | 55/493 |

FOREIGN PATENTS

| 231,895 | 3/1959 | Australia................. | 55/354 |
| add.47,338 | 12/1936 | France ..................... | 55/354 |
| 20,132 | 12/1882 | Germany.................. | 55/354 |
| 456,676 | 2/1928 | Germany.................. | 55/484 |
| 120,192 | 11/1947 | Sweden.................... | 55/354 |

*Primary Examiner*—Dennis E. Talbert, Jr.
*Attorney*—Cushman, Darby & Cushman

ABSTRACT: Conventional roll-type band filters for filtering for example air in ventilating ducts, comprise a drawoff roller and a takeup roller for a filter band, the band being from time-to-time rolled up to expose a fresh surface. Considerable space may be saved by the arrangement of the invention, in which a filter case is provided for insertion in the duct, which case contains two or more filter bands disposed substantially parallel to the flow of gas being filtered, separated gas streams in the filter case being deflected at an angle to pass through one of the filter bands. In a particular embodiment one or more of the filter bands are contained in replaceable magazines for insertion in the filter case.

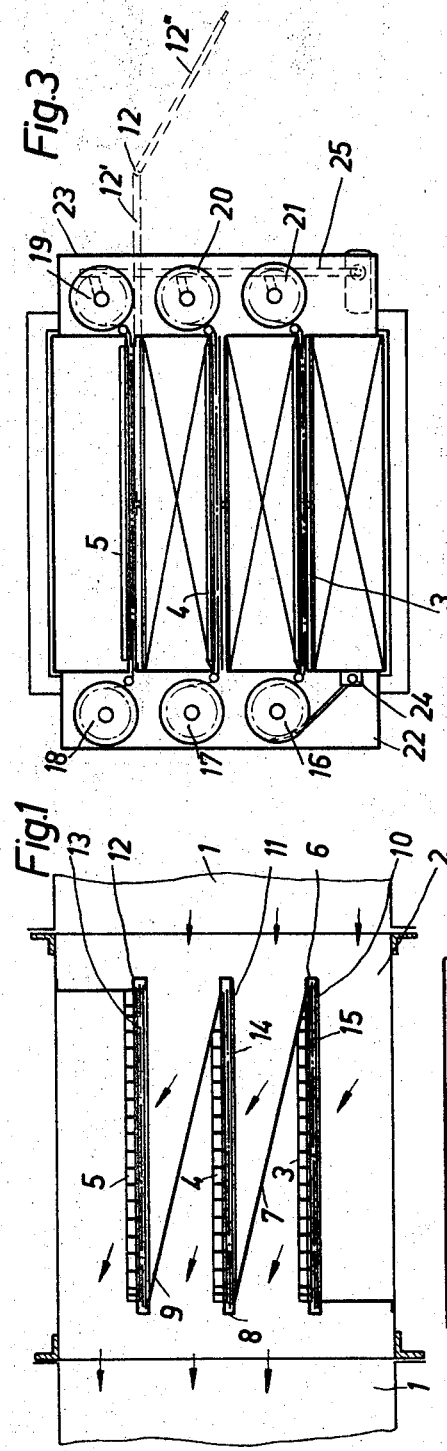

Inventor:
GERHARD MAX NEUMANN
By Cushman, Darby + Cushman
ATTORNEYS

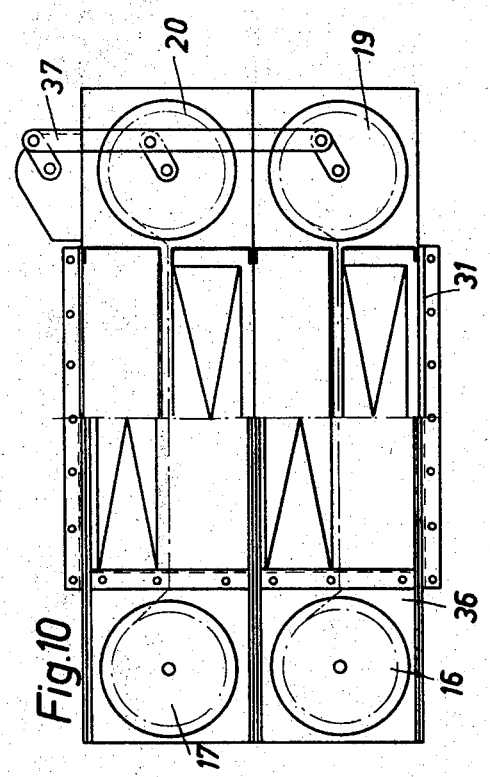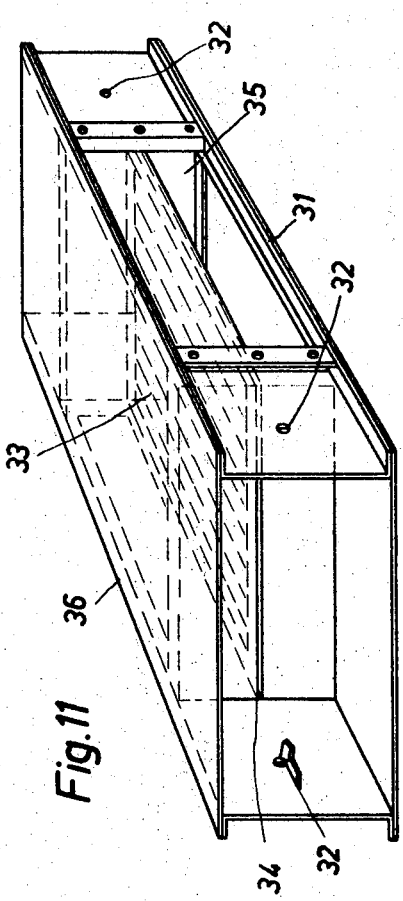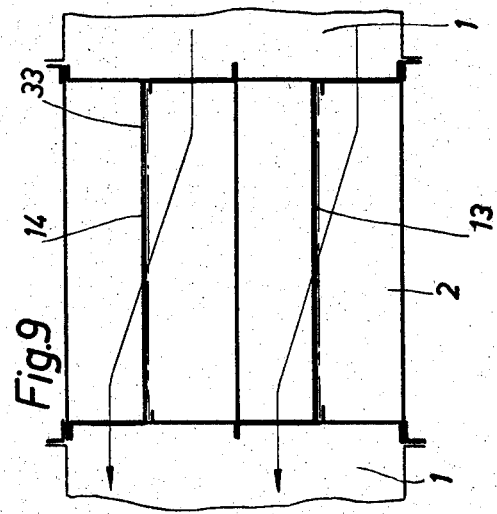

ROLL-TYPE BAND FILTER SUITABLE FOR VENTILATING DUCTS

This invention relates to a roll-type band filter housed in a filter casing for incorporation in ducts, particularly ventilating ducts, to provide straight-through flow therethrough of gaseous medium being filtered. Such filters are known as "straight-through" filters.

Conventional roll-type band filters comprise a drawoff roller and a takeup roller for a filter band, the medium to be filtered passing through the portion of band exposed between the two rollers. When this portion of the band is filled it is replaced by simultaneously winding a fresh portion of band off one roller and the charged portion onto the other. When the drawoff roller is empty both rollers are replaced by a fresh set of rollers. Although such roll-type band filters have many advantages, there is a disadvantage in that they require a disproportionately large amount of space in relation to the area of filtering surface which they provide. If the space required for their maintenance is additionally taken into account, the total space needed becomes very large. To a considerable extent this is due to the fact that only a limited length of the thick filter band usually consisting of a glass fibre or synthetic fibre material can be wound on a roller. Another adverse factor is the need of adapter ducts required for bridging differences between the cross section of the installed ducting and the cross section of the filter casing containing the exposed filter surface. These accessories also add to the space requirements of such a filter.

It is the object of the invention to provide an automatic roll-type band filter which will expose a filter surface of any desired size and capacity, and which is smaller than filters hitherto used, and which can be directly installed or incorporated in ducts or channels, particularly air ventilating ducts.

The invention consists of a roll-type band filter of the type comprising a filter case adapted to be inserted in a duct to allow gas flowing through the said duct to pass straight through the said filter case; a movable filter band wound on a drawoff roller and a takeup roller and disposed in the said filter case so that gas passing through the filter case passes through a portion of the filter band and is filtered thereby; and driving means for moving the said filter band to expose a fresh portion of filter band within the filter case; the improvement which comprises the provision of at least two filter bands arranged substantially parallel to each other and to a stream of gas passing through the said filter case; gas dividing means to divide a stream of gas passing through the said filter case into a number of separate streams; gas deflecting means for deflecting each of the said separated streams of gas through a separate filter band; and common driving means for all the said filter bands whereby the said filter bands may be moved simultaneously.

Supporting grids may be provided for the filter bands extending in the overall direction of gas, e.g. air flow.

In one embodiment of the invention the gas deflecting means consist of plates extending from the edge of one, e.g. lower grid on the dirty air side of the filter case to the opposite edge of an adjacent e.g. upper, grid on the clean air side. This arrangement forces each of the separated streams of air through a separate filter band, air flow within the filter case therefore being at an angle, e.g. in an upwards direction. By this means a larger filtering surface is made available, although the space required does not substantially exceed the overall dimensions of the duct or channel in which the filter case is placed. If the bottom member of each supporting grid has the form of a slide-in frame composed of two hingeably connected sections of about equal lengths, then the space required for maintenance is also minimized, since loading and drawing in a fresh filter band is facilitated by the provision of the slide-in frames.

The dividing means for the incoming gas stream may be provided by the leading edge of the deflector plates or the leading edge of the grids. In embodiments where each band filter is contained in a separate unit as hereinafter described, the separating means may be provided by the upstream edges of the magazines.

According to a particular embodiment of the invention, each band filter is accommodated in a separate magazine in the general form of a drawer which is insertable into the straight-through filter case. Each magazine contains a drawoff and a takeup roller as well as a supporting grid and gas deflector means, and may contain also drive means for the takeup rollers. By this arrangement the replacement of the band filter can take place after removal of the magazine from the filter case. Hence little space need be made available in the vicinity of the filter case to permit replacement of the filters.

In one embodiment of the said drawer-type magazine, the magazine contains a supporting grid centrally between a drawoff and a takeup roller. One sidewall of the magazine has an open portion on one side of, e.g. below, the said grid, and an opposite sidewall has an open portion on the other side of, e.g. above, the said grid. By this arrangement, deflecting means are provided for deflecting a stream of gas at an angle through the filter pad supported by the grid.

The magazines, being self-contained units, can be easily inserted into the straight-through filter case and properly sealed. Furthermore they can be readily assembled to form filtering units of major size containing four or five such magazines in tiers.

Figure 8:
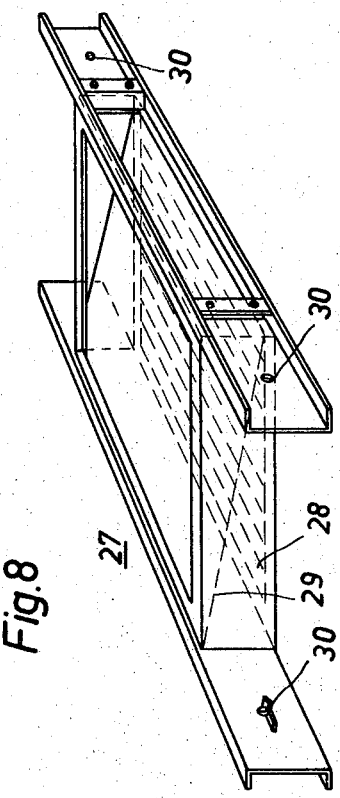
Figure 5:
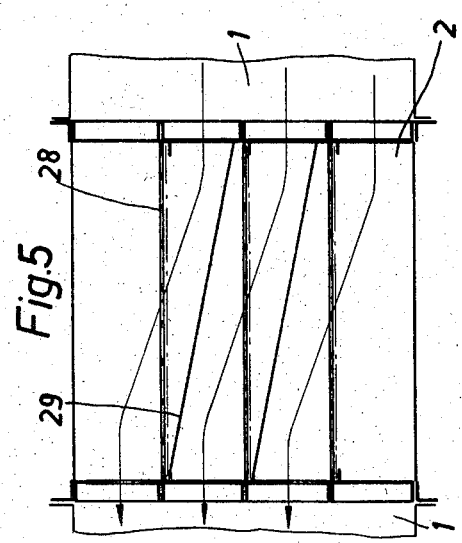
Figure 6:
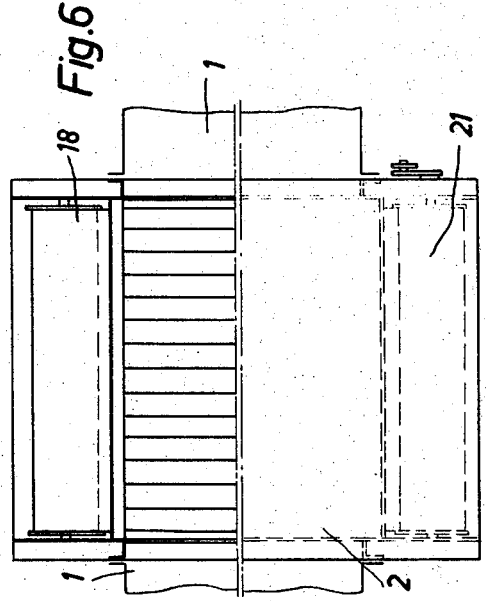

Embodiments of the invention are hereinafter described and illustrated in the accompanying drawings, of which:

FIG. 1 is a vertical longitudinal section of one embodiment,
FIG. 2 is a plan view of the embodiment of FIG. 1,
FIG. 3 is a cross section of the embodiment of FIG. 1,
FIG. 4 is a longitudinal section of a slide-in frame for the embodiment of FIG. 1,
FIG. 5 is a vertical longitudinal section of a further and different embodiment of the invention,
FIG. 6 is a plan view of the embodiment of FIG. 5,
FIG. 7 is a cross section of the embodiment of FIG. 5,
FIG. 8 is a perspective view of a drawer-type magazine for use in the embodiment of FIG. 5,
FIG. 9 is a vertical longitudinal section of yet a further and different embodiment of the invention,
FIG. 10 is a cross section of the embodiment of FIG. 9, and
FIG. 11 is a perspective view of a drawer-type magazine for use in the embodiment of FIG. 9.

Referring to FIGS. 1 to 4 of the drawings, a straight-through filter case 2 is built into a duct or air trunk 1 and the joints sealed. Three supporting grids 3, 4 and 5 are permanently fitted into the case in tiers. From the edge 6 of the grid 3 on the dirty air side, a separator 7 extends to the edge 8 of the screen 4 on the clean air side of the filter case. In a similar manner a separator 9 is provided between the two grids 4 and 5. Filter bands 13, 14 and 15 which are unwound from drawoff rollers 16, 17 and 18 respectively and wound up on takeup rollers 19, 20 and 21 respectively, move between the grids 3, 4, 5 and slide-in frames 10, 11, 12 disposed underneath. The rollers are contained in airtight compartments 22 and 23 attached to the straight-through filter case 2. Chamber 22 may contain a detector element 24 which indicates the diameter of the unwinding roll, whereas chamber 23 contains drive means for the takeup rollers. In the illustrated embodiment this is a crank drive 25.

Air which flows in the arrowed direction is divided in the filter case into three equal branch streams, each branch stream passing through one of the filter bands 13, 14 and 15 in upflow. It will thus be understood that a very large filtering surface is provided in a simple form of construction in a minimum amount of space within the cross section of the air trunk. For reloading fresh filter bands cords may be used in the usual manner. However, in a preferred embodiment the slide-in frame 12 may be used, which comprises two hingeably connected parts 12' and 12'' and which is fitted with press-on springs 26. The end of the filter band can be clamped into the hinge and together with the frame pulled to the takeup roller thereto. Moreover, the frame 12 the filter case 2 ensures that the filter band inside the said filter case is firmly located and makes sealing contact at both edges. When inserted each of the said slide-in frames may form the lower member of one of the said grids 3, 4 and 5.

In the embodiment illustrated in FIGS. 5 to 8 drawer-type magazines 27 (FIG. 8) are provided. These each contain a supporting grid 28, a separator 29 and bearings 30 for the drawoff rollers 16, 17 and 18 and the takeup rollers 19, 20, 21. These magazines can be inserted into the straight-through filter case 2 in tiers and sealed all round. When the rollers require renewal the magazines 27 are withdrawn as complete units and loaded with fresh rolls outside the duct or trunk. The space required for maintenance adjacent the straight-through filter case 2 is thus a minimum.

Similar advantages apply to the embodiment illustrated in FIGS. 9 to 11. Magazines 31 (FIG. 11) fitted with bearings 32 for drawoff and takeup rollers are provided. However, the supporting grid 33 is in this embodiment centrally located in the magazine, the filter band running through a central slot 34. One of the sidewalls 35 of the magazine is open above the level of the grid, whereas the other sidewall 36 is open below the level of the grid. When the magazine is in position the dirty air flows from below through the filter band 13 or 14 upwards.

In this and the previous embodiment crank drives 37 are provided for winding on the filter band. This must be so designed that the cranks can be easily connected to and disconnected from the crankshafts, because the magazines are replaced as complete units.

I claim:
1. A roll-type band filter comprising:
   a filter casing adapted to be inserted in a straight-through duct, said casing having an inlet at one end thereof and an outlet at the other end thereof;
   at least two drawoff rollers;
   at least two movable filter bands each partially wound on a respective one of said drawoff rollers;
   a takeup roller for each filter band, each filter band being connected to its respective takeup roller; each drawoff roller being paired with a said takeup roller, the rollers of each pair being spaced apart from one another with each filter band between the rollers of its pair being oriented so a to extend across the duct;
   a supporting means for supporting each of said filter bands, each of said supporting means comprising a lower member formed by a slide-in frame, said slide-in frames comprising two hingeably-connected sections;
   gas dividing means in said casing at said inlet for dividing a stream of gas entering said filter casing into a plurality of separated streams;
   deflecting means in said casing for deflecting each of said separated streams through a different one filter band of said filter bands; and
   common driving means for all said filter bands, whereby said filter bands may be rolled from respective drawoff rollers and onto respective takeup rollers simultaneously.

2. A roll-type band filter according to claim 1, in which the said filter bands are disposed in tiers, said supporting means comprising grids extending in the overall direction of a flow of gas in the said filter casing, the said grids having a deflector plate attached thereto extending from the edge of a grid on a gas inlet side of the said filter casing to the edge of an adjacent grid, on a gas exit side of the said casing.

3. A roll-type filter according to claim 1, in which the said hingeably-connected sections of each slide-in frame are of substantially equal length.

4. A roll-type filter according to claim 1, in which all the said drawoff rollers are contained in a common chamber, and all the said takeup rollers are contained in a common chamber, the said common chambers being attached to the said filter case.

5. A roll-type filter according to claim 4, in which common drive means are provided for all the takeup rollers in the said common chamber therefor.

6. A roll-type filter according to claim 5, in which the said common drive means comprise a crank connected to each of the said takeup rollers, and a common shaft connecting each of the said cranks.

7. A roll-type filter according to claim 4, in which the said common drive means are contained in the said common chamber for the said takeup rollers.